April 5, 1949. G. H. HARRED 2,466,544
APPARATUS FOR STACKING AND CONVEYING OBJECTS
Filed Oct. 12, 1946 9 Sheets-Sheet 1

Inventor:
George H. Harred
By Irving... White
Attorneys.

April 5, 1949. G. H. HARRED 2,466,544
APPARATUS FOR STACKING AND CONVEYING OBJECTS
Filed Oct. 12, 1946 9 Sheets-Sheet 2

Inventor:
George H. Harred
By *[signature]*
Attorneys.

Inventor:
George H. Harred

April 5, 1949.　　　　G. H. HARRED　　　　2,466,544
APPARATUS FOR STACKING AND CONVEYING OBJECTS
Filed Oct. 12, 1946　　　　　　　　　　　　9 Sheets-Sheet 4

Inventor
George H. Harred
By Armington & ...
Attorney

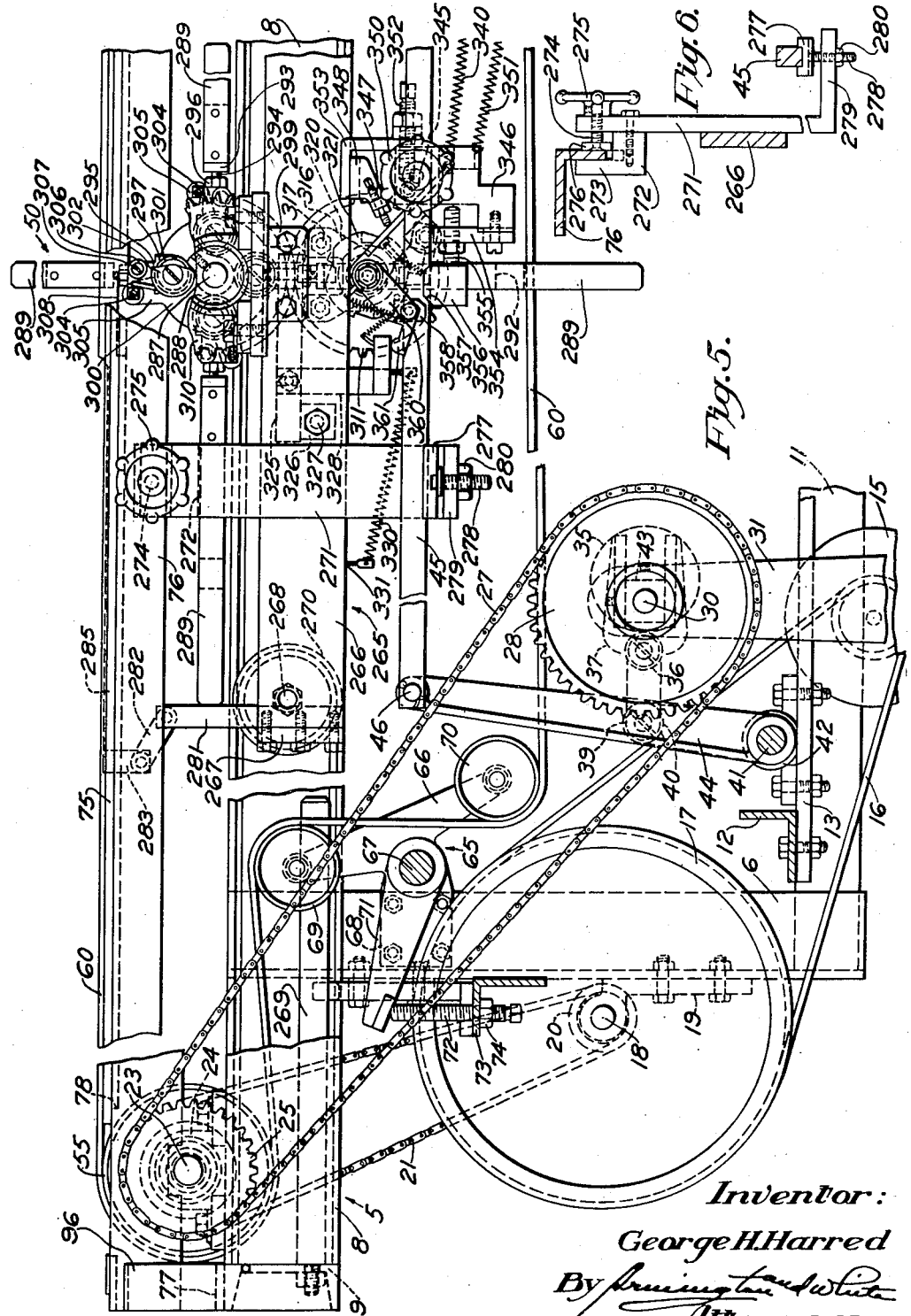

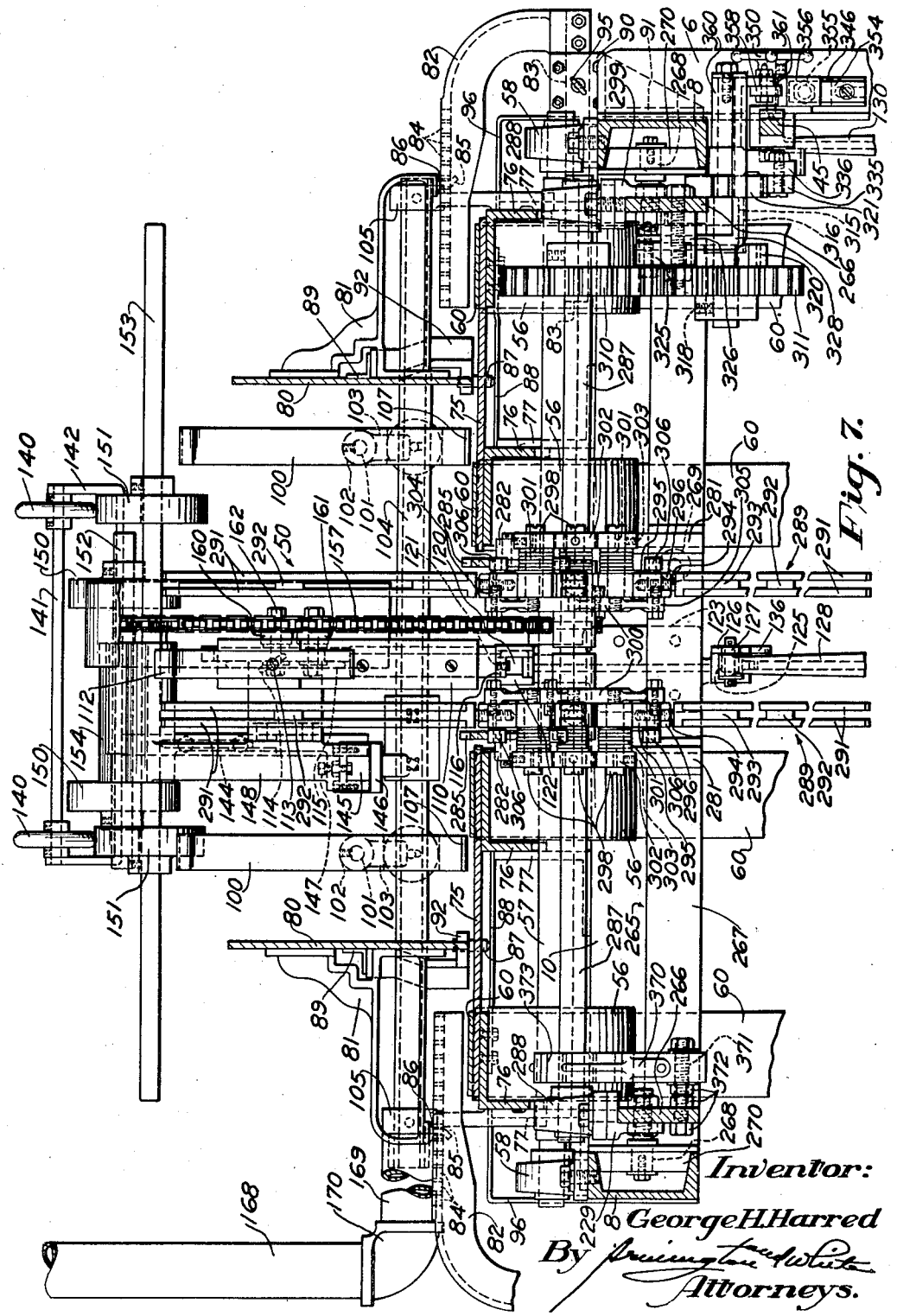

April 5, 1949.  G. H. HARRED  2,466,544
APPARATUS FOR STACKING AND CONVEYING OBJECTS
Filed Oct. 12, 1946  9 Sheets-Sheet 7

Inventor:
George H. Harred
By [signature]
Attorneys.

April 5, 1949.    G. H. HARRED    2,466,544
APPARATUS FOR STACKING AND CONVEYING OBJECTS
Filed Oct. 12, 1946    9 Sheets-Sheet 8

Inventor:
George H. Harred
By [signature]
Attorneys.

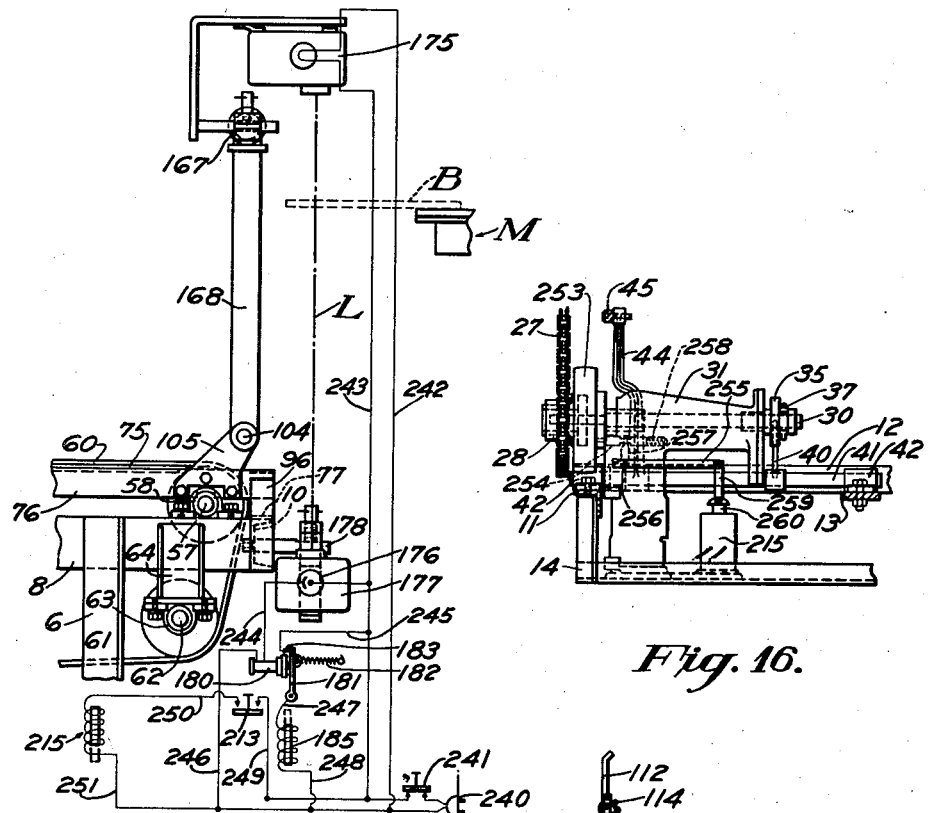
Fig. 18.
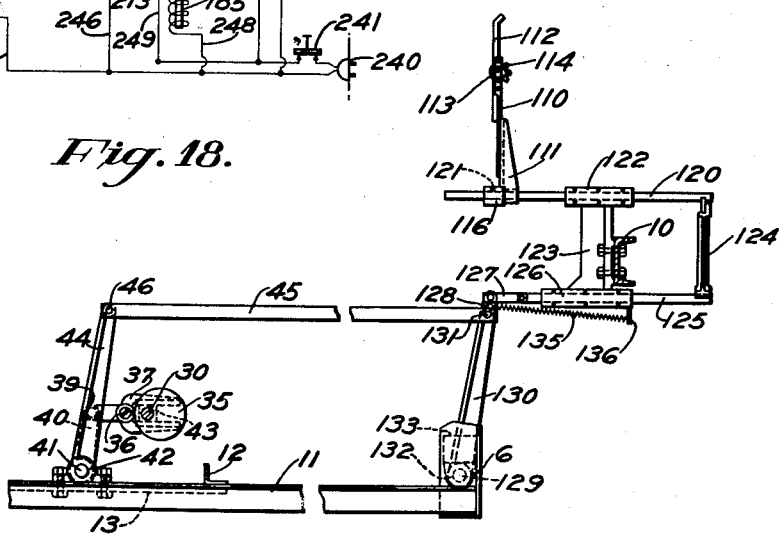
Fig. 16.
Fig. 17.
Inventor:
George H. Harred
By Pennington & White
Attorneys.

Patented Apr. 5, 1949

2,466,544

UNITED STATES PATENT OFFICE 2,466,544

APPARATUS FOR STACKING AND CONVEYING OBJECTS

George H. Harred, East Greenwich, R. I., assignor, by mesne assignments, to Bostitch, Inc., a corporation of Rhode Island Application October 12, 1946, Serial No. 702,987

11 Claims. (Cl. 271—75)

This invention relates to an apparatus for transferring various objects and articles from a processing machine to another location and particularly to an apparatus for counting sheets, carton-blanks or the like as they are delivered from the processing machine and transporting them in measured quantities to a desired location.

The present invention is particularly concerned with improvements in an apparatus of the type disclosed in my prior United States Letters Patent No. 2,424,093, dated July 15, 1947, and this application is in part a continuation thereof.

One object of the present invention is to provide an apparatus of the type indicated adapted to receive carton-blanks or similar sheet-like articles as they are discharged from a processing machine, count and stack the articles in groups or piles of certain number and thereafter transfer the stacks or piles to a location where they may be further processed or tied together in bundles for shipment.

A particular object of the present improvement is to provide an apparatus of the type indicated which is accurate in counting the carton-blanks or other objects, capable of stacking them in precise alined relationship, transporting the stacks while maintaining the blanks in alinement, handling the blanks or other objects at high speed and generally operating efficiently for the purpose described.

Another object is to provide an apparatus of the type indicated adapted for convenient adjustment for objects of different dimensions, both transversely and longitudinally, and also readily adjustable for varying the number of objects deposited in each stack.

Further objects of the invention are set forth in the following specification which describes a preferred form of construction of the apparatus, by way of example, as illustrated by the accompanying drawings. In the drawings:

Fig. 5 is a complementary, side elevational view of the delivery end of the apparatus, in the same plane as that of Fig. 4, showing a portion of the driving connections;

Fig. 6 is a part-sectional detailed view of the clamping means for the adjustable carriage mounting the rests and releasing arms for the stack;

Fig. 7 is a part-sectional, end-elevational view of a portion of the apparatus on line 7—7 of Fig. 3 looking in the direction indicated by the arrow;

Fig. 16 is a detailed view of the clutch-mechanism for connecting the drive to operate the stack releasing means;

Fig. 17 is a detailed view in reduced scale showing the mechanism for operating the slidable pusher-guide for maintaining the blanks in alinement in the stack as they are conveyed along the apparatus; and Fig. 18 is a diagrammatic view of the wiring and electrical elements of the apparatus shown in their relation to the counting mechanism at the head-end of the apparatus.

In the manufacture of various sheet-like articles it is a common practice to deliver the processed objects from a cutting, printing, labeling, taping, stitching or other processing machine to a table or bench and thereafter manually group the articles in a stack. The objects are generally counted, stacked and tied together manually to form bundles suitable for shipment or in some cases they are stacked for further processing. The number of articles such as sheets contained in each stack or bundle generally depends upon the size and type of the processed articles and the purpose for which they are to be used. For example, cardboard or fiber cartons are usually manufactured in plants employing machinery for carrying out the various steps of cutting the sheet-material to the required size, slitting and scoring the blanks to form the panels and flaps of the cartons, stitching or taping the panels together and finally counting the completed blanks and tying them together in bundles of predetermined number. These bundles or stacks of blanks then may be transported to other plants for use in packing and shipping various articles in the cartons or containers.

The present invention is concerned particularly with providing an improved apparatus for receiving processed sheet-like articles as they are delivered from any usual processing machine, counting and assembling the articles in groups or stacks of predetermined number and transporting the stacks to a location where the articles may be further processed or tied in bundles for shipment. More specifically, the present improved apparatus comprises a series of continuously-moving conveyor-belts, means for receiving and stacking the sheet-like articles above the conveyor-belts without contact therewith, means for counting the individual articles as they are delivered by the processing machine and stacked above the belts, means for controlling the arrangement of the stacked articles in symmetrical alined relationship, and means operative as each stack is completed to a predetermined number of articles for releasing the stack onto the conveyor-belts and transporting it to another location.

*Example of one type of processing machine*

Figure 1:
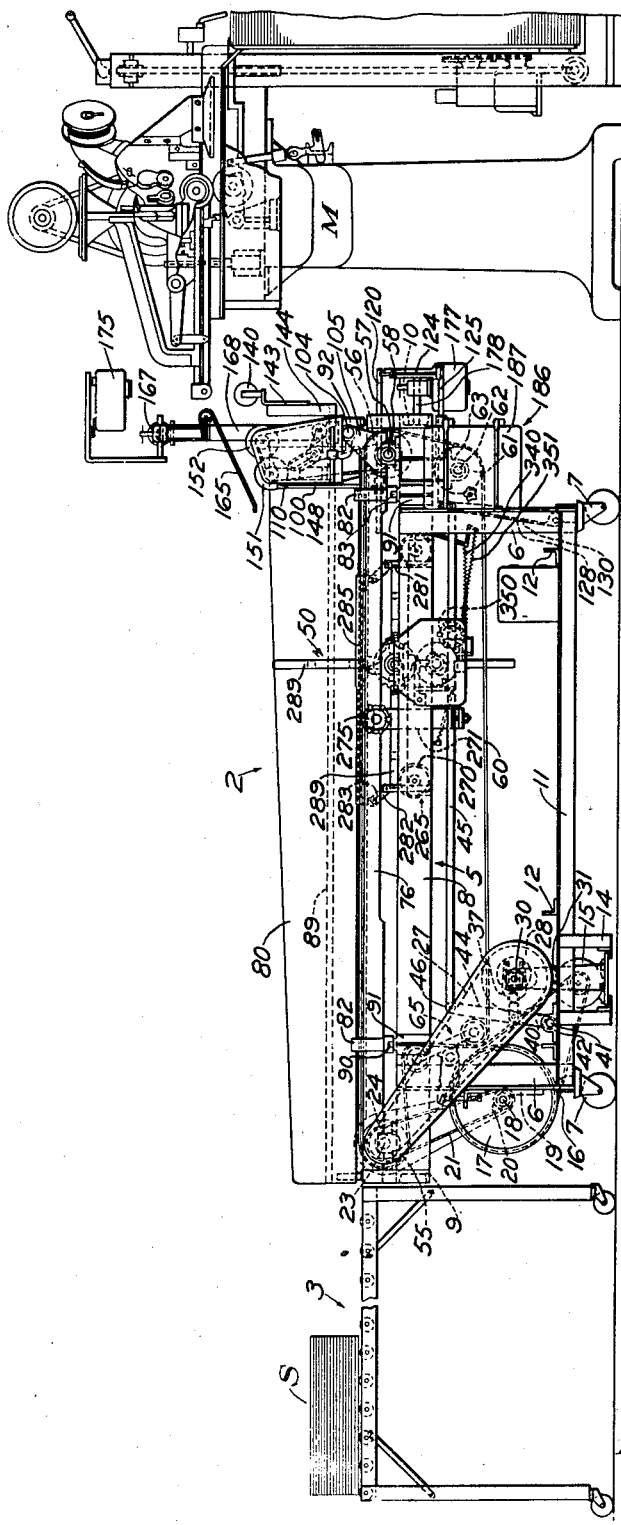
Fig. 1 is a side elevational view of the present improved apparatus shown as arranged for use with a wire-stitching or stapling machine for receiving and stacking the stitched carton-blanks feeding therefrom and also illustrating a stand or truck on which the stacks are deposited by the apparatus.

Referring to Fig. 1 of the drawings, the present improved apparatus, designated generally by the reference character 2, is herein shown as arranged for use with a carton-stitching or stapling machine M for receiving the stitched carton-blanks as the latter are delivered therefrom. It is to be understood, however, that this showing is by way of example only, since the present apparatus is applicable to other uses in counting and stacking various objects or articles as they are delivered thereto from other types of processing machines. After the articles have been counted and stacked in predetermined number the stacks are transported or conveyed from the apparatus and as shown in Fig. 1 they may be deposited on a wheeled table or truck 3 for tying in bundles suitable for shipment. The wire-stitching machine M, herein shown by way of example, may be of the type disclosed in my United States Letters Patent No. 2,381,743, dated August 7, 1945. Since the stitcher M forms no part of the present invention, suffice it to state that it has automatically-operated means for intermittently feeding the stitched carton-blanks continuously therefrom to deliver them to the present apparatus.

Usually, it is the practice to simply feed the stitched carton-blanks from the machine and deposit them on a bench or on a table where they build up to form an irregular pile. The blanks are piled on the bench or table haphazardly so that it is difficult to count the units and frequently the pile topples over to render the counting and bundling laborious and time-consuming. To obviate these difficulties the present invention provides an improved apparatus for receiving and stacking the blanks directly as they are delivered from the processing machine, counting the blanks as they are assembled in a stack and transporting the completed stacks to another location where they may be conveniently bundled or served to another processing machine.

*General organization of the apparatus*

Figure 2:
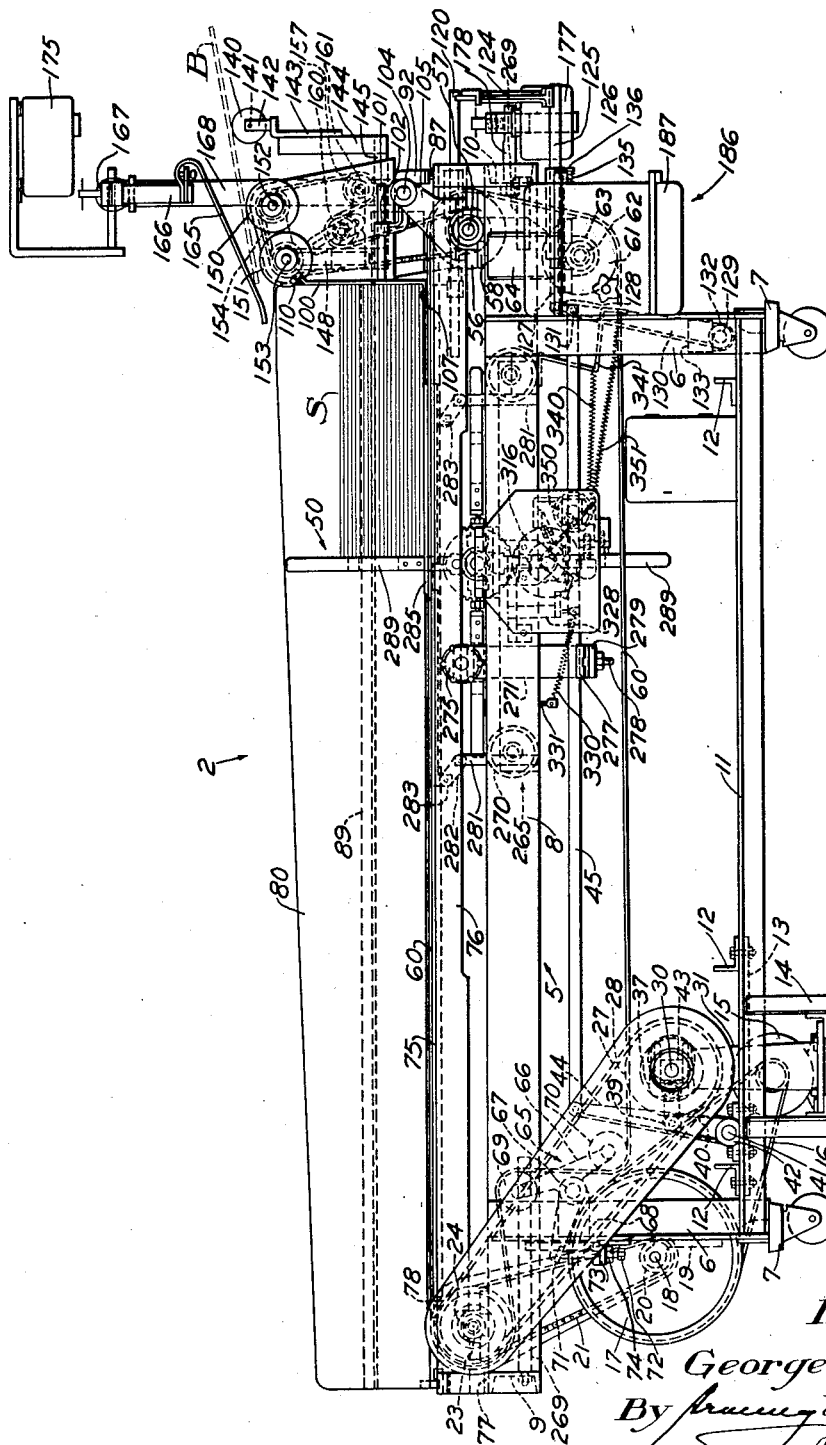
Fig. 2 is an enlarged elevational side view of the apparatus showing its parts more in detail.
Figure 3:
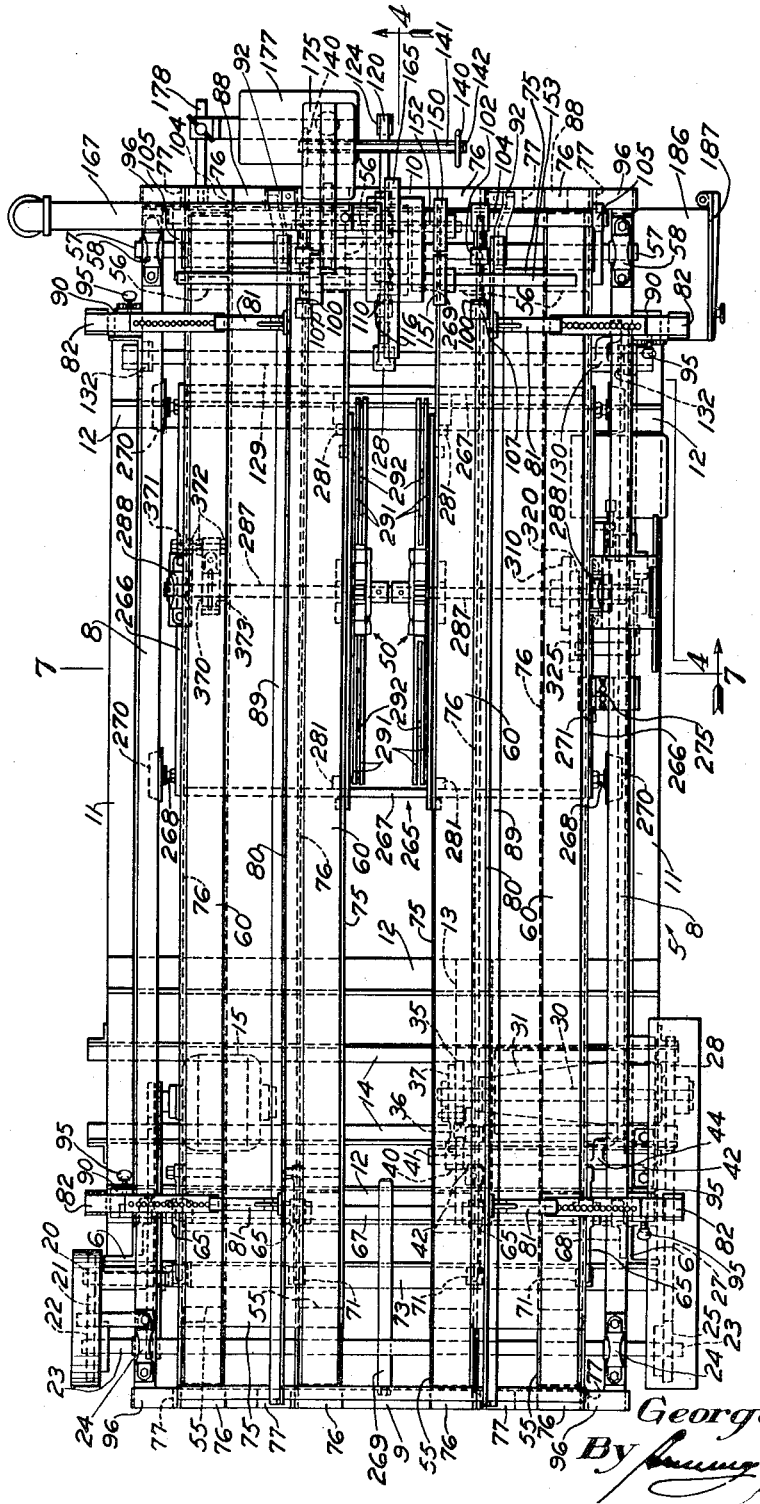
Fig. 3 is a plan view of the apparatus.

Referring to Figs. 1, 2 and 3 of the drawings, the apparatus may comprise a rectangular framework 5 formed by channel- and angle-irons and constituting a raised bed supported by four legs or corner posts 6 carrying casters 7 for rolling it on the floor. If desired, a suitable clamping device (not herein shown) may be employed for anchoring the framework to the floor. Referring particularly to the enlarged views, Figs. 2, 4, 5 and 6, the bed of the machine may be constituted by side rails 8 of channel-iron connected together at the opposite ends by similar channel-irons 9 and 10. The legs 6 may be constructed of lengths of angle-iron bolted or welded to the side rails 8 and connected at their lower ends by angle-iron stretchers or braces 11 welded or bolted thereto. The framework 5 may be further braced by cross-members 12 of angle-iron extending between and fastened to the stretchers 11, as shown most clearly in Figs. 2 and 3.

*Driving mechanism*

As illustrated in Figs. 1 and 2, the right-hand end of the apparatus which mounts the mechanism for receiving, counting and stacking the sheets may be considered the head of the machine, while its opposite end carries the motor-drive for the operating mechanism of the apparatus. Supported in a hanger 14 depending from the horizontal stretchers or braces 11 is an electric motor 15 connected by a belt 16 to a relatively large pulley 17. The pulley 17 fast on a short shaft 18 which is journaled in a bearing 19 mounted on one of the legs 6 of the framework 5, see Fig. 5. The shaft 18 carries a sprocket 20 fast thereon and connected by a transmission chain 21 to a sprocket 22 on a transverse shaft 23 journaled in bearings 24 bolted to the overhanging ends of the side rails 8 at this end of the machine. The shaft 23 also carries another sprocket 25 on its outer end beyond the forward side rail 8 which is connected by a chain 27 to a sprocket 28 on a shaft 30. The shaft 30 is journaled in bearings at the upper end of a bracket 31 having its base supported from the hanger 14 which serves as the mounting for the electric motor 15 at the driving end of the machine, see Figs. 2 and 5. The shaft 30 carries an edge-cam or eccentric 35 with its periphery engaging a roller 36 journaled on a fork 37. The fork 37 is pivotally connected at 39 to an oscillatable lever 40 fast on a shaft 41 journaled in bearings 42 mounted on a plate 13 bolted to two of the angle-iron braces 12 which extend between the stretchers 11 connecting the legs 6 of the framework 5. The fork 37 straddles the side of a block 43 on the shaft 30 and is adapted to slide thereon under the impulse of the eccentric 35 acting against the roller 36. The lever 40 is oscillated by the eccentric 35 to rock a second parallel lever 44 fast on the shaft 41 at the forward side of the machine as viewed in Fig. 3. A horizontal bar 45 is pivoted to the upper end of the lever 44 at 46 to adapt it to be reciprocated longitudinally therefrom. The reciprocable bar 45 is employed for actuating a pair of rotary spiders 50 having radial arms which engage the end of the stack S as later more specifically described, see Figs. 1, 4 and 7; and also to operate a movable pusher-guide for the stack described in detail hereinafter.

Stack-conveying means

The transverse shaft 23 is rotated continuously by the drive-pulley 17 driven from the motor 15. Referring to Figs. 1, 3 and 5, the shaft 23 carries a series of four pulleys 55 fast thereon and spaced at intervals therealong. A second series of spaced pulleys 56, shown in Figs. 3 and 7, are fast on a transverse shaft 57 journaled in bearings 58 bolted to the side rails 8 at the opposite or head end of the machine and alined with the first series of pulleys for receiving endless conveyor-belts 60. The belts 60 have their upper courses stretching substantially the full length of the framework 5 and passing down around idler pulleys 61 on a shaft 62 at the head end of the frame 5. The shaft 62 is journaled in bearings 63 supported from hangers 64 fastened to the ends of the side rails 8, see Fig. 2. The lower courses of the belts 60 extend back toward the opposite end of the framework 5 to pass around their drive pulleys 55 with belt-tighteners 65 intervening therebetween. Each belt-tightener 65, see Fig. 5, is constituted as a crossarm 66 rockably mounted on a shaft 67 held in bearings 68 fastened to the legs 6 of the framework 5 and carrying idler pulleys 69 and 70 journaled on the ends of the arm. Each belt 60 passes under its respective idler pulley 70, thence over the idler pulley 69 and continues therefrom around its drive pulley 55. For adjusting the belt-tighteners 65 to take up the slack in the belts 60, each arm 66 has a rearward extension 71 engaged by the end of a bolt 72 screwed through the flange of an angle-iron 73 extending between and fastened to the end legs 6 of the framework 5. By turning the bolts 72 the belt-tighteners 65 can be rocked to tighten the belt 60 and a check-nut 74 on each bolt serves to lock it in position to maintain the adjustment.

Referring to Figs. 2, 4, 5 and 7, the upper courses of the belts 60 overlie and slide on two lengths of fiberboard 75 extending substantially the length of the framework 5 and resting on angle-iron rails 76, see Fig. 7, which are connected at their ends to angular brackets 77 fastened to the channel-irons 9 and 10 which connect the side rails 8. The ends of the boards 75 clear the faces of the pulleys 55 and 56 to permit the belts to pass thereover and their angle-iron rails 76 which extend the whole length of the framework have their upper flanges cut away at 78 to clear the faces of the pulleys. The four belts 60, shown in section in Fig. 7, serve as the means for supporting and conveying the stacks of blanks from the apparatus, it being here noted that in some instances where stacks of relatively narrow blanks are being conveyed only the two belts of the inner pair are in operation; whereas, when wider blanks are being operated upon the two outer belts may be employed to support their ends.

Stack-guiding means

Each completed stack of carton-blanks is guided along the length of the apparatus by means of side-boards 80, see Figs. 2, 3 and 7, which are adjustable in accordance with the width of the stack. Two pairs of brackets 81 at opposite ends of the framework 5 support the vertically-positioned side-boards 80 which are suitably attached to their upright portions. The brackets 81 are adapted to be mounted in adjustable spaced-apart relationship on elbow-shaped arms 82. The arms 82 are bolted to the outer ends of square rods 83 and reach upwardly in curved portions extending inwardly to overlie the top of the framework 5. The horizontal extensions of the arms 82 are provided with series of drilled holes 84 adapted to receive hook-like pins 85 projecting downwardly from the ends of the brackets 81. Each bracket 81 is formed with a foot 86 at its outer end, the under face of which is convexed and adapted to rest on the top of the horizontal extension of its respective arm 82. At the inner end of each bracket 81 are vertical extensions straddling an angle-iron 89 which is fastened to and extends the length of the side-boards 80 to reinforce it. Each side-board 80 is fastened to the vertical portion of the bracket 81 with screws or other means not herein shown. At the head end of the machine a pair of curved arms or brackets 92 are fastened to the angle-iron brace 89, see Fig. 4, with vertical pins or studs 87 at their lower ends resting upon flat sheet-metal strips 88 to serve as further supports for the side-boards 80. The strips or rests 88 are supported with their outer ends brazed or welded to the under side of the angle-irons 76, previously described as extending the length of the framework and underlying the boards 75; while their inner ends rest on the upright flanges of angle-irons 77 which are fastened to the channel-iron cross-members 10 at the head end of the framework 5. As before indicated, the side-boards 80 may be adjusted toward or away from each other by lifting the brackets 81 off from the arms 82 and placing their pins 85 in different holes 84 in the horizontal extensions of the arms. To provide for a maximum extent of adjustment of the side-boards 80 outwardly beyond the two outside conveyor-belts 60, when blanks of extreme width are being operated upon, the arms 82 themselves are movable outwardly with respect to the sides of the framework 5. For this purpose the square rods 83 which mount the arms 82 are slidable in bearings 90 having depending portions 91 welded to the outer faces of the side rails 8. Set-screws 95 screwed into the sides of the bearings 90 provide for locking the bars 83 with the arms 82 in adjusted position. When the arms 82 are adjusted outwardly beyond the sides of the framework 5 the studs 87 on the brackets 92 will rest on the top of sheet-metal strips 96 which are of angular shape with their downwardly-extending portions welded to the outer faces of the rails 8. In this way the brackets 81 and 92 mounting the side-boards 80 may be adjusted to extreme spaced relationship to accommodate stacks of carton-blanks of maximum width.

Blank-stacking and alining means

Figure 4:
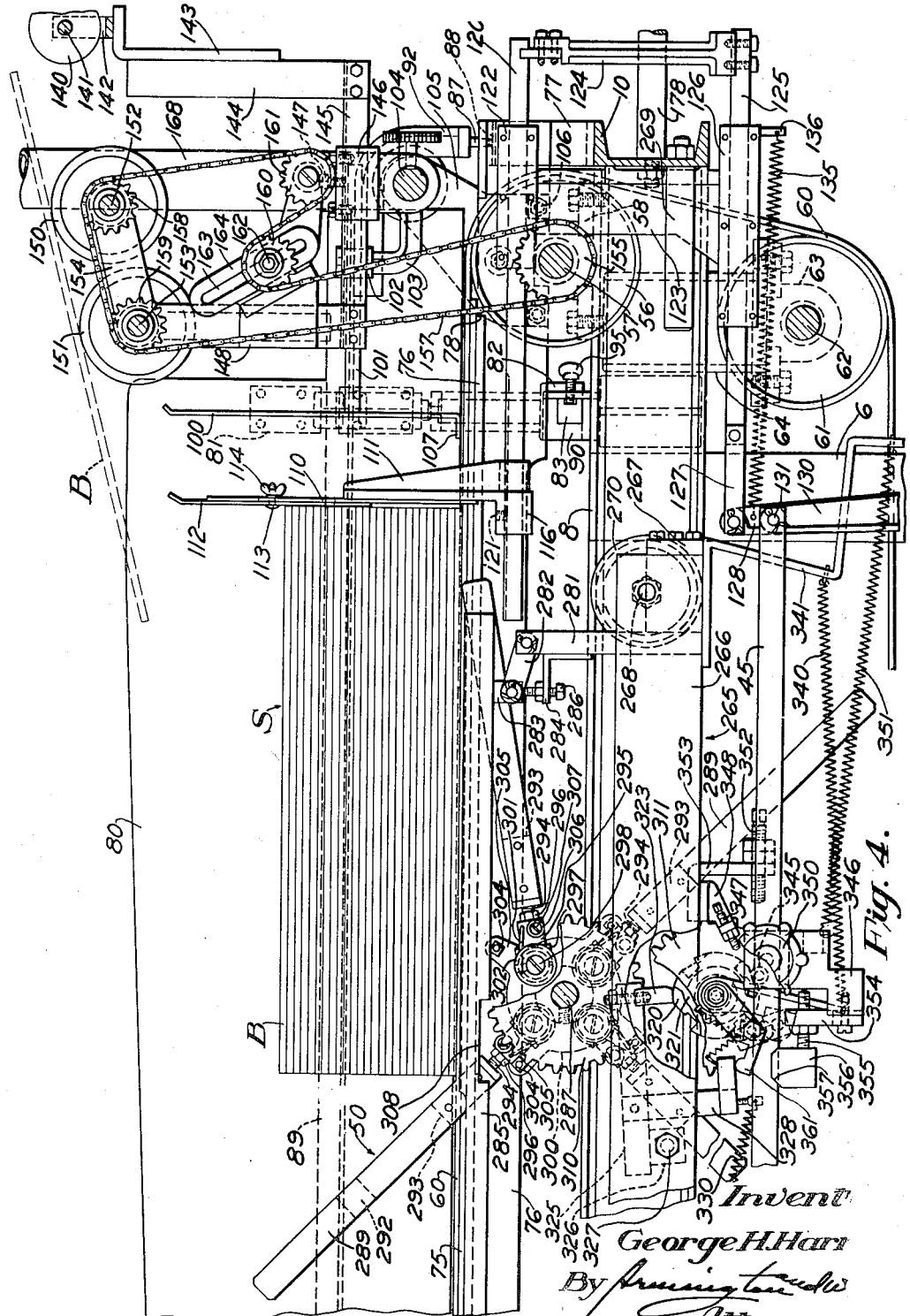
Fig. 4 is a still further enlarged side elevational view of the apparatus, part-sectional on line 4—4 of Fig. 3, showing its main operating mechanisms.

As before stated, the carton-blanks B are delivered from the processing machine at the head end of the apparatus, being received and guided into overlying alined relationship by stacking means embodying spaced uprights forming a compartment shown more particularly in Fig. 2. A pair of fixed uprights or guides 100, see Figs. 4 and 7, are supported at the forward ends of horizontal rods 101 adjustable in bearings 102 at the end of elbow-shaped arms 103 which are mounted on a transverse rod 104. The rod 104 is supported from brackets 105 which are bolted at 106 to the vertical flanges of the angle-iron 76, previously mentioned as supporting the boards 75 on which the outer conveyor-belts slide. The upright guides 100 have their upper portions inclined rearwardly while their lower ends are bent forwardly at right-angles to form rests 107 on which the rearward end of the stack S of blanks B is supported as shown in Fig. 2. A third vertical upright or guide 110, see Figs. 4 and 7, is mounted to slide longitudinally of the bed of the machine as the stack S starts its travel on the conveyor-belts 60. The movable guide 110 is employed particularly to maintain the stacked blanks B in alined relationship throughout a part of their travel. The guide 110 may comprise a strip of sheet-metal brazed or welded to an upright arm 111 and having a blade 112 adjustably mounted to slide vertically thereon. For this purpose a bolt 113 carrying a wing-nut 114 passes through a hole in the slidable blade 112 and through a vertical slot 115 in the upright 110 so that it may be adjusted in height in accordance with the height of the stack S of blanks B being handled. The arm 111 has a bearing 115 at its lower end enclosing a square rod 120 to adapt the arm for adjustment longitudinally thereof, a set-screw 121 serving to lock the arm in its position of adjustment. The rod 120 is slidable in an elongated bearing-box 122 mounted on a bracket 123 which is belted to the channel-iron or cross-member 10. The rod 120 is connected by means of an arm 124 to a lower parallel rod 125 slidable in a second bearing box 126, also forming a part of the bracket 123. The opposite end of the slidable rod 125 is connected by a pivoted link 127 to a rockable lever 128 fast on a shaft 129 and carrying a second lever 130, see Fig. 7, fast thereon to which the horizontal slide bar 45, previously described, is pivotally connected at 131. The shaft 129 is journaled in bearings 132 on brackets 133 welded or otherwise fastened to the opposite legs 6 of the framework 5; see Fig. 2. Fig. 17 illustrates the construction and arrangement of these last-described elements for sliding the guide 110 forwardly during the movement of the stack S as the eccentric 35 is actuated by the driving mechanism of the machine, previously described. A spring 135 connected to the lever 128 and anchored at its opposite end to a pin 136 on the under side of the bearing 126 tends to draw the lever 128 toward the right as viewed in Figs. 4 and 17. A more detailed explanation of the method of operation of this part of the mechanism is given hereinafter in connection with the description of the operation of the complete apparatus.

Blank-feeding means

The carton-blanks or other sheet-like objects are delivered from the processing machine to feed across a pair of guide-wheels or rollers 140, see Figs. 2 and 4, mounted on a shaft 141. The shaft 141 is journaled in a bracket 142 mounted on an angle-shaped support 143 which is bolted to or formed as a part of an upright 144. The upright 144 is bolted to a square bar 145 supported in a bearing-box 146 supported upon the transverse rod 104, see Fig. 7. A set-screw 147 in the top of the bearing-box 146 may be released to allow adjustment of the rod 145 to regulate the position of the guide-wheels 140. A second upright or standard 148 is bolted or otherwise secured to the forward end of the rod 145 to provide a mounting for two pairs of feed-rolls 150 and 151 which are driven continuously to advance the carton-blanks across the vertical guides 100 and 110. The pairs of feed-rolls 150 and 151 are mounted fast on shafts 152 and 153, respectively, journaled in bearings on the standard 148, the latter being of elbow shape with an offset arm 154 for spacing the bearings apart. As shown in Fig. 7, the two feed-rolls 151 are adjustably mounted on the shaft 153 which is of considerable length to adapt them to be spaced apart a suitable distance to accommodate carton-blanks of extreme width. The pairs of feed-rolls 150 and 151 are driven continuously from the transverse shaft 57 which carries the belt-pulleys 56 at the head end of the machine. For this purpose a sprocket 155 fast on the shaft 57 drives an endless transmission chain 157 running over sprockets 158 and 159 keyed to the shafts 152 and 153. As shown in Fig. 4, the chain 157 extends from the drive-sprocket 155 to the driven sprockets 158 and 159, with its slack length leading upwardly and riding over an adjustable idler-sprocket 160, thence under a second fixed idler-sprocket 161 to lead up to the sprocket 158. The adjustable sprocket 160 is journaled on a stud 162 which is slidable in a slot 163 in an inclined member 164 forming a part of or fastened to the upright 148. As the shaft 57 is driven by the belts 60 passing over the pulleys 56 the sprocket and chain connections between said shaft and the shafts 152 and 153 will rotate the feed-rolls 150 and 151 in contra-clockwise direction. The feed-rolls 150 and 151 will thus function to feed the carton-blanks forwardly and downwardly across the ends of the upright guides 100 and 110 to deposit them in the stack S, see Fig. 2. As shown in this latter view, a guard 165 is mounted above the rollers 150 and 151 as a precaution against the blanks rising up off the latter as they are delivered from the processing machine. Preferably, the guard 165 is in the form of an inclined spring-blade looped at its rearward end and fastened to a bracket 166 which is mounted on a horizontal tubular arm 167. The arm 167 projects laterally from a column 168 rising from one side of the framework of the machine, see Fig. 7. As shown in this latter view the column 168 may be formed of a suitable length of pipe connected to a lower horizontal pipe 169 by an elbow 170 and secured to the transverse rod 104, previously described as supported from brackets 105 fastened to the angle-iron supports 76 at the side of the framework 5, see Figs. 4 and 7. The tubular column 168 and its cross-arm 167 serve as a conduit for the electrical wiring of the apparatus shown in the schematic view, Fig. 18.

Blank-counting means

The blanks fed from the processing machine are counted during their delivery to the apparatus by means of a photo-electric unit at the head end of the machine. This unit is of substantially the same construction as shown and described in my pending application, Serial No. 522,012, previously referred to above. As shown more particularly in Figs. 1, and 2, the counting unit may comprise an electric lamp 175 or other source of light mounted on the horizontal cross-arm 167 of the column 168 previously mentioned. The beam of light L, indicated by dot-and-dash lines in Fig. 18, is projected downwardly to a photo-electric cell or light-sensitive tube 176 contained within a box 177. The box 177 is suspended from a rod 178 bolted to the flange of the channel-iron cross-member 10 extending across the framework 5 at the head end of the machine.

The cell 176 is connected in circuit with the windings of a relay-coil 180 so that when the cell is activated by the beam of light L the relay will be energized. The relay-coil 180 is normally energized to maintain a switch-arm 181 swung toward the left, as viewed in Fig. 18, against the tension of a spring 182 to hold it in engagement with a contact-element 183. The switch-arm 181 is connected in circuit with an electromagnet 185 employed for operating the ratchet-mechanism of the control-unit, shown in detail in Figs. 8 to 11, inclusive.

Control-unit

Figures 8, 9:
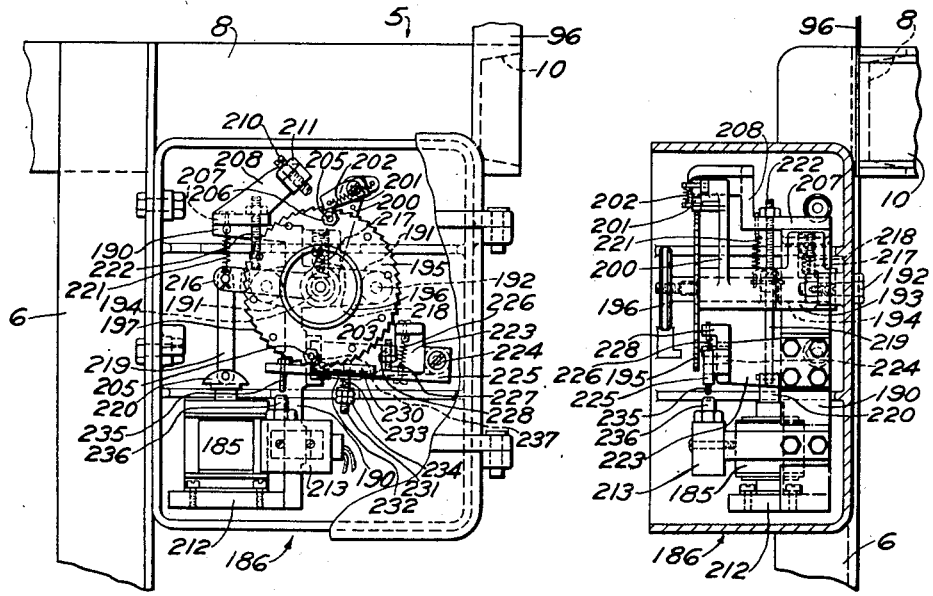
Fig. 8 is a view of the control-box shown with its cover broken away to illustrate the electrically-operated ratchet-means for counting the objects as they are assembled in each stack.
Fig. 9 is a side view of the same showing the control-box in section to illustrate the mechanism contained therein.
Figures 10, 11:
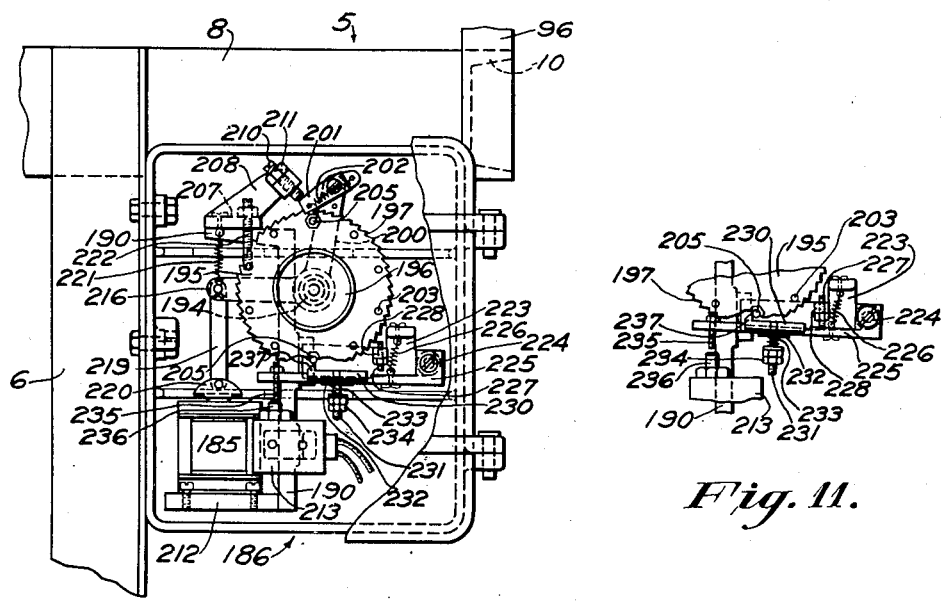
Fig. 10 is a view similar to Fig. 8 showing the ratchet-mechanism as having been operated to initiate the conveying of a stack along the apparatus.
Fig. 11 is a detailed view of the ratchet-control mechanism.

The control-unit comprising the electromagnetically-actuated ratchet-means is contained in a control-box or casing 186 bolted to one of the legs 6 at the head end of the machine, see Fig. 2, and provided with a hinged cover 187 which may be opened for inspecting and adjusting the device. Referring to Figs. 8 to 10, the mechanism within the casing 186 is substantially the same in construction and arrangement as that shown in my pending application referred to above and will be described only briefly herein.

A vertically-extending bracket 190 has laterally-projecting arms 191, see Fig. 8, fastened to bosses on the rearward wall of the box 186 by means of bolts 192 shown in Fig. 9. Journaled in a hub-like bearing 193 on the bracket 190 is a shaft 194 reduced in diameter at its outer end to receive a ratchet-wheel or disk 195 held against the shoulder on the shaft by a hand-nut 196. A bell-crank lever 200 has its hub mounted to turn on the shaft 194 with its upright arm carrying a pivoted pawl 201 biased by a spring 202 to cause its pointed end to engage with the teeth 197 on the ratchet-disk 195. As shown in Figs. 8 and 10, the ratchet-disk 195 is provided with fifty teeth on its periphery whereof it may be used for counting fifty blanks, or less numbers thereof, such as five, ten, twenty-five, etc. The disks 195 are provided with a series of equidistantly-spaced holes 203 arranged circumferentially thereof for receiving pins 205 adapted to actuate the switch for controlling the circuit to a solenoid 215, see Fig. 16, which operates the clutch-mechanism at the driving end of the machine. The pins 205 are screwed into the holes 203 and locked in place by nuts 206. The holes in the disk 195 and the teeth of the ratchet may vary in number with the number of blanks to be counted and deposited in each stack for transfer from the machine; different disks for this purpose being usually furnished with the apparatus. In the present drawings the holes 203 are shown as spaced five teeth apart with two pins 205 inserted therein at diametrically-opposite points or spaced at 180° around the disk 195 whereof to adjust the device to adapt it to count twenty-five blanks for a stack. The bracket 190 has a lateral extension 207 at the top from which projects an inclined arm 208. A set-screw 210 threaded through the end of the arm 208 is adjustable to adapt its end to engage the end of the pawl 201 to limit the extent of its throw in turning the ratchet-disk 195. The screw 210 may be adjusted to control the length of stroke of the pawl 201 and then locked in fixed position by means of a nut 211. At the lower end of the bracket 190 is a lateral arm or rest 212 for mounting the electromagnet 185, shown as a solenoid. Also mounted on the bracket 190 is a switch 213 employed for closing the circuit to a solenoid 215 which controls the operation of the clutch-mechanism designated generally at 253 in Fig. 16. The clutch 253 is operated to connect the driving mechanism to actuate the means for lowering the stack of blanks onto the conveyor-belts 60 and releasing the stack for transfer thereby, all as more particularly explained hereinafter. The horizontal arm 216 of the bell-crank 200 has a link 219 connected at its opposite end to the plunger armature 220 of the solenoid 185. A spring 221 hooked to the arm 216 and anchored to the bracket 190 tends to raise the arm to rock the bell-crank 200 in clockwise direction to carry the pawl 201 rearwardly on the teeth of the ratchet-disk 195. A screw 222 in the overhanging portion of the bracket 190 is adjustable to adapt its end to engage the arm 216 to limit the movement of the bell-crank under the tension of the spring 221. When the solenoid 185 is energized its armature will be retracted to draw the link 219 downwardly and rock the bell-crank 200 in contraclockwise direction to cause the pawl 201 to advance the ratchet-disk 195 through the distance of one tooth. A plunger-pin 217, shown by dotted lines in Figs. 8 and 9, is slidable in a bore above the bearing 193 on the bracket 190 and urged by a spring 218 to bear against the shaft 194 to prevent unwarranted turning of the shaft and thereby the disk 195 in either direction.

Extending laterally from the bracket 190 is an arm 223 carrying a stud 224 at its end, on which is pivoted a switch-actuating lever 225, see the detailed view in Fig. 11. The lever 225 is controlled by a spring 226 anchored to an overhanging portion of the arm 223 and tending to raise the lever to hold it against a stop-screw 227 adjustable in a lug 228 on the arm 223. Mounted on the lever 225 is a detent-latch 230 held by a threaded pin 231 projecting through the lever with a washer 232 bearing against the under side thereof and a spring 233 tensioned between another washer and a pair of nuts indicated generally at 234. The lever 225 carries an adjustable screw 235 at its outer end adapted to make contact with the end of a plunger 236 in the switch 213 for closing the electrical circuit through the switch. The lever 225 is depressed to close the electrical circuit through the switch 213 by the pin or pins 205 riding across a beveled projection 237 on the latch 230, see Fig. 10. As the pin 205 rides across the beveled projection 237 on the latch 230 after the ratchet-disk 190 has been turned through any predetermined part of or a complete revolution the lever 225 will be depressed to close the switch 213 and energize the solenoid 215 which controls the drive for the stack-lowering and releasing mechanism.

Electrical circuit

Referring to Fig. 18, current for energizing the solenoids under the control of the counting mechanism described above may be taken through a plug in an outlet indicated at 240 with a manually-operative main switch shown at 241 in said circuit. Suitable conductors 242 and 243 connect the light-source or lamp 175 with the light-sensitive tube 176, and the circuit is continued through wire 244 to the relay-coil 180 and thence through the conductor 246 back to the other side of the line. A wire 245 leads from the conductor 243 to a contact for the switch-arm 181. The solenoid 185 is connected with the switch-arm 181 by a wire 247 and the end of its coil continued in a wire 248 leading to the opposite side of the circuit. The switch 213 is connected in the circuit by wires 249 and 250, the wire 250 leading to the clutch-operating solenoid coil 215 with the opposite end thereof connected in circuit by the wire 251.

*Electrically-operated clutch-mechanism*

The clutch 253, shown generally in Fig. 16, is of substantially the same construction and arrangement as that described in my prior application referred to above. The clutch-members are mounted on the shaft 30 journaled in the bracket 31, previously described as supported from the hanger 14 which mounts the electric motor 15. The shaft 30 carries the eccentric 35 which operates to rock the lever 40 for sliding the horizontal rod or bar 45, all as previously explained, the shaft being driven by the clutch 253 connecting it to the sprocket 28. The sprocket 28 is driven by the chain 27 from the continuously-operated shaft 18 connected to the motor 15. Suffice it to state herein that the clutch 253 may be of any suitable construction with one member driven continuously by the sprocket 28 and clutched to another element on the shaft 30 by releasing a pin 254 therefrom, the pin being slidably mounted in a bore in the bearing bracket 31 and actuated from the solenoid 215 through a lever 255. The lever 255 is pivoted at 256 and connected to a vertical arm 257 forming a bell-crank therewith, see Fig. 16. The upper end of the arm 257 has a fork straddling a reduced portion of the pin 254 for sliding the latter against the tension of a spring 258 held in a pocket in the bearing-bracket 31. Pivoted to the outer end of the lever 255 is a link 259 which connects it to the plunger-armature 260 of the solenoid 215. Energization of the solenoid 215 will retract its armature 260 to rock the lever 255 and thereby withdraw the pin 254 from the clutch-element to actuate the clutch mechanism and connect the shaft 30 for rotation by the sprocket 28. The eccentric 35 will thereby be rotated to slide the fork 37, see Figs. 5 and 17, to oscillate the lever 40 for reciprocating the bar 45 which operates the stack-lowering and releasing means. The energization of the solenoid 215 is of short duration so that the eccentric 35 is rotated only for a predetermined period or through one complete revolution; the pin 254 being re-engaged with the driven clutch element to arrest the rotation of the shaft 30 after the lever 40 has been rocked from one extreme to the other and back again to function in the manner explained more fully hereinafter.

*Carriage for stack-rests and end-holding means*

The rests for supporting the stack above the conveyor-belts 60 and the fingers or arms which abut the forward end of the stack as the blanks are being deposited thereon are mounted on a carriage 265 which is slidable longitudinally of the framework 5 of the apparatus and adjustable in position in accordance with the length of the objects being operated upon. As shown in Figs. 2, 3, 5 and 7, the carriage 265 is comprised of side plates 266 connected by cross-members 267 bolted to their ends in the form of a rectangular structure. Journaled on studs or axles 268 bolted to the ends of the side plates 266 are two pairs of flanged wheels or rollers 270 having tapered peripheries adapted to roll on the inclined flanges of the side rails 8 of the framework 5, see Fig. 7.

The carriage 265 may be locked in any position to which it is adjusted longitudinally of the framework 5 by means of a clamping device constructed as next described. Welded to the outer face of one side plate 266 of the carriage 265 is a flat vertical strip 271, see Figs. 5, 6 and 7, reaching up across the vertical flange of the outer angle-iron 76 which extends along the side of the frame-work 5 and forms one of the rests for the board 75 for supporting the conveyor-belts 60. A block 272 fastened to the top of the strip 271 has an upright portion 273 engaging against the rearward face of the flange of the angle-iron 76, see Fig. 6. A screw 274 threaded through the strip carries a handwheel 275 at its outer end with a shoe 276 at its inner end adapted to be clamped against the flange of the angle-iron 76 to hold the carriage against movement along the side rails 8. The plate 271 extends below the carriage 265 and is provided with a rest or support for the sliding bar 45 to prevent the latter from sagging, see Fig. 5. The rest may consist of a slotted plate 277 adapted to be adjusted in height by means of a screw 278 threaded through a laterally-projecting shelf 279 on the plate 271 and locked in place by a nut 280. Suitable stop rods 269 are bolted to the end channel-irons 9 and 10, see Figs. 2, 4 and 5, to limit the movement of the carriage 265 along the side rails 8.

*Stack-rests*

Rising from the opposite ends of the carriage 265 are four posts 281 fastened to the cross-members 267. Pivoted to the upper ends of the posts 281 are links 282 which are pivotally connected to lugs 283 on the under side of horizontal bars 285 which form the rests for supporting the stack S above the conveyor-belts 60. The links 282 serve as rockable hinge-arms for adapting the rest bars 285 to be depressed to lower the stack onto the conveyor-belts 60 while maintaining them in horizontal position. Fastened to the side of each of the posts 281 adjacent the end of the carriage 265 nearest the head end of the machine are angle-iron brackets 284 having set-screws 286 threaded therethrough with their ends adapted to bear against the ends of the lugs 283 on the underside of the rest bars 285 to support them in their lowered position, see Fig. 4. The rest bars 285 are raised and lowered through means mounted on a rotatable shaft 287 and actuated by the longitudinal movement of the bar 45. The shaft 287 is journaled in bearings 288 mounted on brackets 299 bolted to the side plates 266 of the carriage 265, see Figs. 5 and 7.

*Rotary spiders*

Figures 12, 13:
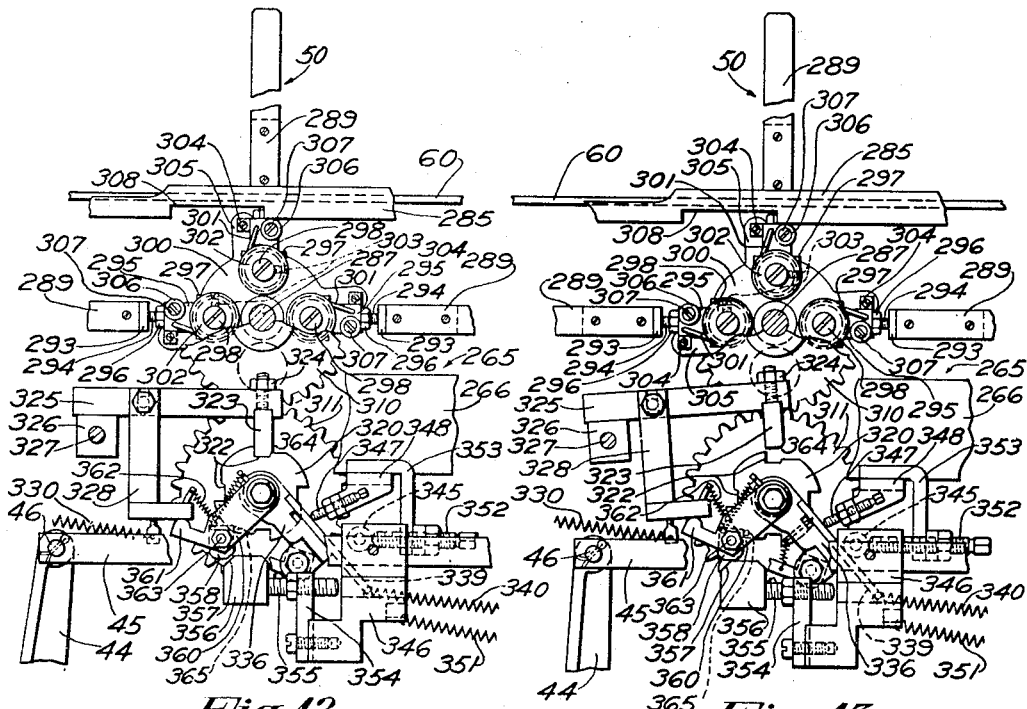
Fig. 12 is a view of the operating mechanism for the rotary spiders which control the grouping of the articles in a stack and illustrating the driving means therefor as locked in fixed position.
Fig. 13 is a similar view of the driving mechanism for the rotary spiders showing it unlocked to permit rotation of the spiders.
Figures 14, 15:
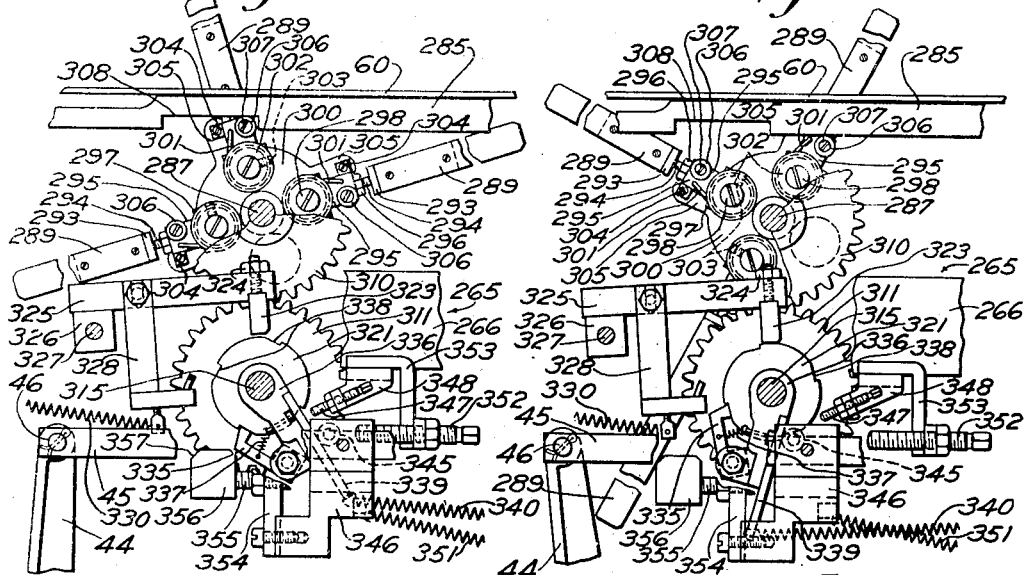
Fig. 14 is a similar view showing the spiders as being rotated from the driving means.
Fig. 15 is a similar view illustrating the spiders as turned to a further advanced position (the showing of one of the arms of each spider being omitted in the last four described views to avoid obscuring other parts of the device)

A series of arms 289 are disposed in pairs with each pair in turn adapted to be projected into upright position above the bed of the machine to function as a gate for defining the end of the compartment into which the blanks or other objects are deposited to form a stack. Four arms 289 are arranged like spokes radiating from the axis of the shaft 287, thus constituting a spider 50, previously mentioned, two of which are mounted in spaced relationship on the shaft and rotatable therewith, see Figs. 4, 5, 7, and 12 to 15, inclusive. The two spiders 50 are positioned between the inner conveyor-belts 60 as shown in Fig. 7 with their raised arms 289 in opposed spaced relation to the fixed uprights or guides 100. Each arm 289 may comprise two opposite strips 291 of wood fastened in parallel spaced relationship as shown in Fig. 7 by means of blocks 292 inserted therebetween and riveted thereto. The inner ends of the two parallel strips 291 of each arm 289 are riveted to the sides of a metal support 293 having a threaded shank 294 screwed into a socketed spoke-member 295 and fixedly secured by a checknut 296. Each member 295 is formed with a hub 297 mounted on a stud 298 for pivotally attaching the member and arm 289 to a supporting disk 300 secured fast on the shaft 287. Referring to Figs. 7 and 12, the pivotal displacement or rocking motion of each arm 289 about the axis of its stud 298 is controlled by a helical spring 301, one end of which is fastened to the member 295 and its opposite end anchored in a collar 302 secured fast on the stud by a set-screw 303 as shown more particularly in Fig. 7. Each collar 302 may be turned on its stud 298 to wind up the spring 301 and the set-screw 303 engaged with the shank of the stud to hold the spring under tension. The springs 301 tend to rotate the supporting members 295 to swing the arms 289 in contraclockwise direction about the axis of the disk 300 on which they are mounted. Detent-blocks 304 screwed to the ends of radial fingers 305 on the disk 300 are arranged to engage the sides of the members 295 to limit the movement of the arms 289 in contraclockwise direction. The arms 289 are free to swing in the opposite clockwise direction against the tension of the springs 301. The socket members 295 for the arms 289 carry rollers 306 journaled on studs 307 and adapted to ride up in under the rest bars 285 to raise them into position to support the stack S above the conveyor-belts 60 as shown in Figs. 12 and 15. When the spiders 50 are turned to carry their vertically-positioned arms 289 downwardly as shown in Fig. 14, the rollers 306 will ride along the bottom of the associated restbars 285 into slots or recesses 308 therein to cause the rest bars 285 to be depressed to lower the stack S onto the conveyor-belts 60. At this juncture the vertically-positioned arms 289 of the two spiders 290 will be rotated contraclockwise to release the stack S, as indicated in Figs. 4 and 15, to adapt it to be traveled by the belts 60 and deposited on the truck 3.

*Means for rotating spiders*

The shaft 287 is rotated to turn the spiders 50 in the manner last explained by means of a gear 310 meshing with a driving gear 311 on a studshaft 315. The stud-shaft 315 is journaled in a bearing bracket 316 bolted to the inner face of the side plate 266 of the carriage 265 at 317, see Figs. 5 and 7. The gear 311 is held fast on the shaft 315 by a set-screw 318 in its hub, see Fig. 7. The stud-shaft 315 projects outwardly from its bearing beyond the side rail 8 of the framework 5 and carries certain instrumentalities acting to turn the shaft to rotate the gears 310 and 311 and thereafter lock them in position with both spiders 50 in the relationship shown in Fig. 12. A pair of ratchet-disks 320 and 321 are mounted fast on the shaft 315 at opposite sides of the bearing 316, the outer length of the shaft being reduced in diameter as indicated by dotted lines in Fig. 7. The inner disk 320, see Figs. 12 and 13, is provided with a series of radial notches 322 spaced 90° apart around its periphery, each of the notches being adapted to receive a locking stud 323 of rectangular cross-section engageable therein. The locking stud 323 is fastened to a pivoted arm 325 by means of its threaded shank extending through the end of the arm and secured by a nut 324. The arm 325 has a square hub 326 pivoted on a stud 327 screwed into the side plate 266 of the carriage 265, the hub abutting the inner face of said plate as shown in Fig. 7. Projecting downwardly from the arm 325 is an L-shaped extension 328 to which is connected a spring 330 anchored at its opposite end to the under side of the side plate 266 at 331, see Fig. 5. The spring 330 tends to rock the arm 325 to engage its locking stud 323 with one of the notches 322 in the disk 320.

*Actuating means for the spiders*

The gear 311 which drives the gear 310 to turn the shaft 287 on which the spiders 50 are mounted is rotated by the ratchet-disk 321. The ratchet-disk 321 is rotated under the action of a pawl 335 carried at the end of an arm 336 mounted to oscillate about the stud-shaft 315. The pawl 335 is biased by a spring 337 fastened thereto and anchored to the arm 336 to cause its end to engage in one of four notches forming teeth 338 in the ratchet-disk 321. An extension 339 on the arm 336 is connected by a spring 340 to a Z-shaped bracket 341, see Fig. 4, attached to the side plate 266 of the carriage 265, the spring tending to rock the arm rearwardly to retract the pawl 335 relatively of the teeth 338 on the disk 321. Referring to Fig. 12, the rearward motion of the arm 336 is limited by its extension 339 striking the end of a set-screw 347 in a bracket 348 fastened to the side plate 266 of the carriage 265. The arm 336 is caused to be oscillated to carry the pawl forward whereby to turn the disk 321 in clockwise direction by means of a roller 345 carried by a member 346 clamped to the reciprocable bar 45. The member 346 is slotted to receive the bar 45 and is secured in position longitudinally thereof by means of a hand-wheel 350 for clamping a shoe against its opposite side, the construction being substantially the same as that described in connection with the clamp shown in Fig. 6, for fastening the carriage 265 in adjusted position on the framework 5. A spring 351 fastened to the member 346 and anchored at its opposite end to the Z-shaped bracket 341 tends to draw the member 346 toward the right as viewed in Fig. 5 to normally locate the member with its roller 345 against the end of an adjustable stopscrew 352 threaded through an angular bracket 353 fastened to the bracket 348 on the carriage 265. The screw 352 may be adjusted in the bracket 353 to limit the extent of the return stroke of the member 346 after the ratchet-mechanism has been actuated by the movement of the bar 45.

It has been stated that the bar 45 is moved toward the left to cause the roller 345 on the member 346 to rock the arm 336 and actuate the pawl 335 to turn the ratchet-disk 321, but before this can be effected the locking stud 323 must be released from the notch 322 in the disk 320 with which it is engaged. For this purpose the initial movement of the member 346 with the bar 45 is caused to rock the arm 325 to raise the locking stud 323 out of the notch in the disk 320; there being lost motion between the roller 345 and the pawl-arm 336. The member 346 is provided with an upstanding portion 354 through which extends a stud 355 carrying a square block 356 at its end. The forward corner of the block 356 is beveled at 357 to provide an inclined face adapted to engage with a corresponding bevel on a block 358 fastened to the end of a lever 360 by a screw 363, see Figs. 12 and 13. The lever 360 has a laterally-projecting toe 361 formed with a rounded end which engages under the L-shaped extension 328 of the arm 325 for rocking the arm upwardly when the lever is actuated by contact of the block 356 with the block or shoe 358. The lever 360 is maintained with its toe 361 in contact with the L-shaped extension 328 on the arm 325 by means of a spring 362 extending between the lever and the extension. The block 358 is pivoted on a screw 363 to adapt it to rock slightly on the lever 360 being normally held in the position shown in Figs. 12 and 13 by a spring 364 which causes its side to engage a pin 365 in the lever. To control the rotation of the shaft 287 carrying the spiders 50 and prevent its overrunning, due to backlash or play between the parts, a brake 370, shown in Figs. 3 and 7, is provided. The brake 370 may be of any suitable construction in the form of an arm fastened to the side plate 266 of the carriage 265 by a bolt 371 and nuts 372 with its opposite end frictionally engaging a collar 373 fast on the shaft 287 to resist its turning.

*Method of operation of complete apparatus*

The apparatus is adjusted for the particular type of objects to be counted, stacked and conveyed by sliding the carriage 265 longitudinally of the framework 5 after releasing the clamping means by turning the hand-wheels 275 and 350, see Figs. 5, 6 and 7. The wheels 270 on the carriage 265 roll easily on the lower flanges of the side rails 8, see Fig. 7, and the carriage carries the rest bars 285 which support the stack S of blanks B or other objects, and also the rotary spiders 50 whose arms 289 define the forward end of the compartment in which the blanks are stacked. The carriage 265 is adjusted in position with the upright arms 289 of the two spiders 50 spaced at a distance from the vertical guide 110 in accordance with the length of the blanks B, and the rest bars 285 will then be in a position to adapt their rearward portions to underlie the forward portion of the stack S, see Fig. 2. After the carriage has thus been adjusted in proper relationship the hand-wheel 275 is turned to tighten the clamping means against the vertical flange of the longitudinally-extending angle-iron 76 to hold the carriage in fixed position. If the carriage 265 is adjusted toward the left, as viewed in Fig. 5, to increase the length of the space in the blank-receiving compartment the stop-screw 352 will slide the member 346 along the rod 45 into proper relation to the spider-actuating means. On the other hand, if the carriage is moved in the opposite direction the spring 351 will slide the member 346 in the same direction to locate it in contact with the stop-screw 352. After either shifting of the member 346 it is clamped in position by turning the hand-wheel 350. The stop-rods 269 act to engage the ends of the carriage 265 to limit its extent of adjustment in either direction so as to prevent it from interfering with other parts of the mechanism of the apparatus.

To complete the four walls of the compartment for the stack the side boards 80 are adjusted laterally on the framework 5 in accordance with the width of the blanks B or other objects to be handled. Adjustment of the side boards 80 is accomplished by lifting their brackets 81 and moving them along the arms 82 to fit their pins 85, see Fig. 7, in the proper holes 84 in the top of the arms. When the blanks or objects are of extreme size to extend across the full width of the bed of the apparatus to rest on the outer conveyor-belts 60, maximum adjustment of the side boards 80 may be obtained by releasing the set-screws 95 and sliding the rods 83 through their bearings 90, after which the set-screws are tightened to secure the arms 81 in place.

Referring to Fig. 18, current is applied to the electrical circuit by closing the manually-operated switch 241 after the connector has been plugged into the outlet 240. The lamp 175 then will be ignited to case its beam of light L downwardly to the photo-electric cell 176 in the box 177 and the apparatus is ready for operation. The processing machine, which in the present case is represented as a wire-stitcher M, is started to operate to staple the flaps of the carton-blanks fed thereto. Continuous operation of the stitcher M will feed the stapled blanks B therefrom across the rollers 140, 152 and 151, see Fig. 2, to cause them to be deposited in the compartment formed by the guides 100 and 110, arms 289 of the twin spiders 50 and the side boards 80.

As each carton-blank B is discharged from the stitcher M to pass between the source of light 175 and the light-sensitive tube 176 in the box 177 it will interrupt the beam of light L to de-energize the relay-coil 180, see Fig. 18. The switch-arm 181 will therefore be released and swung away from the contact 183 under the tension of the spring 182, whereby to open the circuit to the electromagnet 185 of the counting device in the box or casing 186, see Figs. 8 to 11, inclusive. De-energization of the electromagnet or solenoid 185 will release the bell-crank lever 200 and cause the spring 221 to rock it in clockwise direction to retract the pawl 201 through an idle stroke to the position indicated in Fig. 8. After the trailing edge of the carton-blank B passes beyond the beam of light L and the latter is again projected to the light-sensitive cell 176 the relay-coil 180 will be re-energized and the switch-arm 181 attracted against the contact 183 to close the circuit to the solenoid 185. Energization of the solenoid 185 will cause it to draw down the link 219 and rock the bell-crank 200 to cause the pawl 201 to advance the ratchet-disk 195 through a distance equal to the space of one tooth. In this manner the ratchet-mechanism is actuated repeatedly by the delivery of each carton-blank B to count any predetermined number of blanks delivered to the stacking apparatus. It has been explained that the pins 205 are set in the proper holes 203 in the ratchet-disk 195 in accordance with the whole number of carton-blanks or other objects to be assembled in a stack. For example, as shown in the present drawings, two pins 205 are fixed in diametrically-opposite holes on the ratchet-disk 195 so that each time the disk is turned through 180° it will cause one of the pins to engage the projection 237 on the switch-actuating lever 225 to close the circuit to initiate the operation of releasing the stack and transporting it from the machine. Consequently, since the ratchet-disk has fifty teeth on its periphery each half revolution thereof will act to count twenty-five blanks to be assembled in a stack.

Actuation of the lever 225 by the pin 205 on the disk 195 will depress the plunger 236 of the switch 213 to close the circuit to the solenoid 215 for operating the clutch-mechanism at the driving end of the machine. As the armature 260 is drawn downwardly by the solenoid 215 it will rock the bell-crank, constituted by the arms 255 and 257, see Fig. 16, to withdraw the pin 254 from the clutch and thereby connect the continuously-driven sprocket 28 to rotate the shaft 30 carrying the eccentric 35. The energization of the solenoid 215 is timed from the ratchet-mechanism in the control-box to turn the shaft 30 through one complete revolution so that the eccentric 35, see Figs. 5 and 17, will act on the roller 36 to rock the lever 40 and its connected lever 44 through a complete stroke in each direction. The initial movement of the lever 44 is toward the left, as viewed in Figs. 5 and 17, so that the horizontal bar 45 will be drawn in the same direction to cause the member 346 which is clamped thereto to actuate the ratchet-mechanism for turning the spiders 50. Referring to Figs. 12 to 13, the block 356 carried by the member 346 will first come into engagement with the block 358 on the lever 360 to rock the latter in clockwise direction. Under this action the toe 361 on the lever 360 will act on the L-shaped extension 328 of the arm 325 to swing the latter upwardly about its pivot 327 whereby to withdraw the locking stud 323 from the notch 322 in the disk 320 as shown in Fig. 13. Immediately thereafter the roller 345 on the member 346 will make contact with the arm 336, see Figs. 14 and 15, to rock the arm to advance the pawl 335 and turn the ratchet-disk 321. The motion of the member 346 with the bar 45 is of such extent as to turn the disk 321 through an arc of 90° whereof the gear 311 will rotate the gear 310 to an equal extent. The gear 310 will therefore turn the shaft 287 to rotate the twin spiders 50 to swing their arms 289 through an arc of 90°, thus removing one pair of arms 289 from a vertical position to horizontal relationship while replacing them with the next succeeding arms on the two spiders. It has been stated that each spider has 4 radial arms, but in Figs. 12 to 15 only three arms are shown as the fourth arm would confuse the showing of the driving mechanism.

As the twin spiders 50 are rotated in the manner above explained the rollers 306 on the socket members 295 on the disks 300 will ride along the under side of the rest bars 285 into the slots or openings 308 to permit the rests to drop, as indicated in Fig. 14, so that the stack S of blanks will descend onto the conveyor-belts 60 to be transported thereby; it being understood that there are two rest bars 285 thus operated from the twin spiders 50.

As indicated in Fig. 4 of the drawings, the stack S of blanks B will start to move with the continuously-operated conveyor-belts 60 as it is released by the upstanding arms 289 of the spiders 50 and since the rotation of the spiders is at a relatively rapid rate the stack will be rapidly transported out of the way to provide for assembling the next succeeding stack in the same position. It will be noted by reference to Fig. 4 that as one pair of arms 289 of the twin spiders 50 move away from the leading end of the stack S the next pair of arms will come up under the rearward end of the stack; but due to the fact that the arms are arranged to swing about their pivots 298 on the disk 300 their upward motion is delayed until the stack being transported has advanced to a certain extent. The springs 301 then will complete the upward movement of these following arms 289 and the detent-blocks 304 will engage with the socket members 295 to maintain the arms in vertical position. As the arms 289 rise into upright position their rollers 306 will lift the rest bars 285 to restore them to position for receiving the next series of blanks B to be stacked.

Rotary motion of the spiders 50 is arrested as the member 346 on the bar 45 reaches the end of the stroke to the left after turning the ratchet-disk 321 through 90°, and at this point the bar 45 starts its return motion. As the bar 45 moves toward the right the block 356 rides out from under the block 358 to permit the arm 360 to release the lever 325 which is urged by the spring 330 to re-engage the lock-stud 323 with its related notch 322 in the disk 320. As the eccentric 35 is turned through the second half revolution the relatively strong spring 135 connected to the lever 128, see Fig. 4, draws the bar 45 toward the right to restore it to first position. The return motion of the bar 45 restores the member 346 to its initial relationship with its roller 345 abutting the end of the stop-screws 352. It should be explained that the purpose of mounting the block 358 to pivot on the arm 360 is to insure that the operating block 356 on the member 346 will ride freely under the first-named block during the return stroke of the bar 45.

*Operation of stack pusher-guide*

It has been explained that the bar 45 is connected to the lever 130 which is fast on the shaft 129 carrying the companion lever 128. The lever 128 is connected to the slidable rod 125 through the link 127 and, consequently, during the first described movement of the bar 45 toward the left its motion will be communicated through the levers 130, 128 and link 127 to the rod 125 to cause the latter to move in the same direction. The rod 125 is connected by the arm 124 to the slidable rod 120 which carries the support 111 for the pusher-guide 112 and through the means just described this latter element is caused to bear against the trailing end of the stack S and advance therewith to maintain the blanks B in alinement at the beginning of the travel of the stack with the conveyor-belts 60. In this manner any tendency of the uppermost blanks B in the stack S to lag behind the underlying blanks, due to inertia or other cause, will be overcome so that the blanks will be maintained in symmetrical, alined relationship for transport along the bed of the machine to deliver them to the table 3 shown in Fig. 1. After the completed stack has been transferred to the table 3 it may be slid along the rollers thereof manually to either locate it in position for delivery to another machine or for tying in a bundle to be transported to a location for shipping.

It has been explained that after each stack S has been conveyed from the compartment in which the blanks are assembled, a pair of arms 289 on the twin spiders 50 are carried into upright position to complete another compartment, the rest bars 285 are restored to their raised position above the belts 60, and the pusher guide 112 is restored to first position by the return stroke of the bar 45. The parts of the apparatus are thus automatically readjusted in position to function throughout another cycle to receive, count and stack another set of blanks delivered thereto during the continuous feed of the processing machine. The apparatus may thus be operated continuously without periodic adjustment unless or until a different form or size of blanks or other objects are to be handled therein.

The present apparatus provides important improvements to effect accurate counting of the blanks or other objects as they are delivered thereto; increase the speed of operation of the mechanism for more promptly releasing and transporting the stacks upon their completion; and further to increase the efficiency and dependability of the whole mechanism to insure against disruption of the continuity of functioning of its various parts. While the improvements are herein shown and described as embodied in a preferred form of construction, it is to be understood that modifications may be made therein without departing from the spirit or scope of the invention. Therefore, without limiting myself in this respect, I claim:

1. An apparatus of the type indicated comprising continuously moving conveying means, means for supporting objects in stacked relationship adjacent the conveying means, relatively stationary means for guiding the objects to maintain them in alined relationship, a rotary spider pivoted on an axis below the conveying means and having radial arms adapted to be projected into upright position above the conveying means in opposed relation to the fixed guiding means to form a compartment for the objects, means for releasing the supporting means to lower the stack onto the conveying means, and means operated concurrently therewith for rotating the spider to release its arm from the stack to cause the latter to be transported by the conveying means while moving another arm into position above the conveying means to form a compartment for the next succeeding stack deposited on the supporting means.

2. An apparatus of the type indicated comprising continuously moving conveying means, rests for supporting a series of objects delivered thereto in position elevated above the conveying means, a rotary spider pivoted on an axis below the conveying means and having radial arms movable into upright position above the conveying means for engaging the forward edges of the objects to halt their forward motion across the rests and maintain them in alined relationship in a stack on the rests, means for rotating the spider to release its arm from the stack, and means operated by the rotation of the spider to lower the rests to transfer the stack to the conveying means for transport thereby.

3. An apparatus of the type indicated comprising a framework, conveying means extending longitudinally of the framework, means for operating the conveying means, a carriage adjustable longitudinally of the framework, means for clamping the carriage in adjusted position on the framework, means on the carriage for supporting the objects in elevated position above the conveying means, a spider rotatably mounted on the carriage and provided with radial arms for retaining the objects in alinement on the supporting means, and means operative after a predetermined number of objects have been stacked to lower the supporting means to transfer the stack onto the conveying means and rotate the spider to release the stack for transport by the conveying means.

4. In an apparatus of the type indicated having means for supporting a plurality of sheet-like objects in stacked relationship, and conveying means for transporting the stack, the combination of a spider journaled to rotate on an axis below the conveying means and having radial arms adapted to be projected into erect position above the conveying means and across the end of the stack to maintain the objects in alined relationship, detent means for releasably locking the spider in stationary position, and means operative after a predetermined number of objects have been assembled in the stack to release the supporting means to transfer the stack onto the conveying means, unlock the detent means and rotate the spider to release its arm from the end of the stack to cause the latter to be transported by the conveying means.

5. An apparatus of the type indicated comprising conveying means, means for supporting a stack of abjects adjacent the conveying means, means for transferring the stack of objects from the supporting means to the conveying means, a spider having arms projecting from its axis, means for resiliently maintaining the arms in radial disposition at an angle of ninety degrees, said arms being adapted to project vertically across the end of the stack to maintain the objects in alinement, and means operative after a predetermined number of objects have been assembled in the stack to rotate the spider through an arc of ninety degrees to release one arm from the end of the stack and carry a succeeding arm upwardly into erect position under the control of the resilient means as it rides under and across the trailing end of the stack.

6. An apparatus of the type indicated comprising conveying means, means for supporting objects in stacked relation adjacent the conveying means, means for transferring a stack of objects from the supporting means to the conveying means, a rotary spider having arms projecting radially from its axis, resilient means for maintaining said arms equally spaced apart about the axis of the spider, means for limiting the movement of the arms under the action of the resilient means, means for releasably locking the spider in position with one of its arms projecting vertically across the end of a stack on the supporting means, and means for intermittently rotating the spider to relase one of its arms from the end of a stack and carry a succeeding arm upwardly under the stack as it is transported by the conveying means, said arm being urged by the resilient means to eventually stand in erect position to control another stack of objects as the spider is locked from further turning motion.

7. In an apparatus of the type indicated having a travelable conveyor-belt and means for delivering articles to transport them in stacks on said belt, the combination of a spider journaled to rotate an on axis below said belt and having radial arms pivotally mounted adjacent its axis, detent means for normally maintaining said arms of the spider equidistantly spaced about its axis, resilient means yieldable to permit the arms to pivot to move away from the detent means, and means for intermittently rotating the spider to project each arm into vertical position above the conveyor-belt.

8. In an apparatus of the type indicated comprising a plurality of conveyor-belts arranged in spaced-apart relationship and travelable in unison to convey stacks of articles thereon, the combination of a rotary spider journaled on an axis below said conveyor-belts and having radial arms adapted to project upwardly between the belts, detent means for normally maintaining said arms equidistantly spaced about the axis of the spider, resilient means for permitting the arms to rock rearwardly during rotation of the spider, and means for rotating the spider to cause each arm to be moved into erect position to engage the edges of a series of articles stacked above the conveyor-belts, said resilient means adapting the next adjacent arm to rock rearwardly when it engages under the stack as the first-named arm is moved to release the stack for traveling it on the conveyor-belts.

9. In an apparatus of the type specified having conveying means and means to travel said conveying means to transport articles stacked thereon, the combination of a rotary spider having radial arms pivoted about the axis of the spider to adapt them to swing in one direction, detent means to prevent the arms from swinging on their pivots in the opposite direction, springs for urging the arms into engagement with the detent means, means for rotating the spider intermittently to carry the arms upwardly and forwardly, means to lock the spider in position with one of its arms in erect position above the conveying means, and means for releasing said locking means to permit rotation of the spider through an arc of ninety degrees.

10. In an apparatus of the type indicated comprising conveying means and means for delivering articles for transport on said conveying means, the combination of a spider journaled on an axis below said conveying means, said spider provided with a plurality of arms pivoted on axes surrounding the axis of the spider to adapt them to rock relatively thereto, detent means for preventing the arms from rocking in one direction, resilient means for normally urging said arms into engagement with the detent means, and means for intermittently rotating the spider to successively raise each of the arms into erect position above the conveying means.

11. In an apparatus of the type specified comprising a conveyor-belt and means for traveling said belt to transport articles stacked thereon, the combination of a rest for supporting a stack of articles above the conveyor-belt, means for releasing the articles from the rest to transfer them onto the conveyor-belt, a stationary guide at the rear of said rest, a spider journaled to rotate adjacent the forward end of the rest, said spider provided with radial arms pivoted on individual axes adjacent the axis of the spider, detent means for normally holding said arms spaced equidistantly around the axis of the spider, resilient means for normally holding said arms in engagement with the detent means, and means for rotating the spider to progressively move its arms into erect position in spaced relation to the stationary guide to form a compartment therebetween while adapting the arms to rock on their pivots as they move toward erect position when said arms engage under a stack of articles released from the rest for transfer to the conveyor-belt.

GEORGE H. HARRED.

REFERENCES CITED

The following references are of record in the file of this patent:

UNITED STATES PATENTS

| Number | Name | Date |
|---|---|---|
| 1,365,741 | Speer | Jan. 18, 1921 |
| 1,569,032 | Reichel | Jan. 12, 1926 |
| 1,600,958 | Hart et al. | Sept. 21, 1926 |
| 1,693,632 | Zuckerman | Dec. 4, 1928 |
| 1,792,878 | Wagner | Feb. 17, 1931 |
| 2,256,327 | Parkes et al. | Sept. 16, 1941 |